(12) United States Patent
Wymore et al.

(10) Patent No.: US 6,456,978 B1
(45) Date of Patent: Sep. 24, 2002

(54) RECORDING INFORMATION IN RESPONSE TO SPOKEN REQUESTS

(75) Inventors: Ben S. Wymore, Portland, OR (US); Christopher H. Genly, Forest Grove, OR (US); David G. Hicks, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/494,489

(22) Filed: Jan. 31, 2000

(51) Int. Cl.$^7$ .............................................. G10L 21/06
(52) U.S. Cl. ....................... 704/275; 704/270
(58) Field of Search ................. 704/275, 270, 704/256, 257, 251, 246, 231; 345/158, 700; 348/734

(56) References Cited

U.S. PATENT DOCUMENTS

| | | | | |
|---|---|---|---|---|
| 4,305,131 A | * | 12/1981 | Best ........................... | 364/521 |
| 5,566,271 A | * | 10/1996 | Tomitsuka et al. .......... | 704/275 |
| 5,659,793 A | * | 8/1997 | Escobar et al. ............. | 395/807 |
| 5,774,859 A | * | 6/1998 | Houser et al. .............. | 704/275 |
| 5,875,108 A | * | 2/1999 | Hoffberg et al. ............ | 364/146 |
| 5,889,506 A | * | 3/1999 | Lopresti et al. ............. | 345/158 |
| 5,901,246 A | * | 5/1999 | Hoffberg et al. ............ | 382/209 |
| 5,995,155 A | * | 11/1999 | Schindler et al. ........... | 348/461 |
| 5,995,936 A | * | 11/1999 | Brais et al. ................. | 704/275 |
| 6,075,575 A | * | 6/2000 | Schein et al. ............... | 348/734 |
| 6,081,750 A | * | 6/2000 | Hoffberg et al. ............. | 700/17 |
| 6,154,207 A | * | 11/2000 | Farris et al. ................ | 345/328 |
| 6,192,340 B1 | * | 2/2001 | Abecassis ................... | 704/270 |
| 6,226,745 B1 | * | 5/2001 | Wiederhold ................. | 713/200 |
| 6,249,765 B1 | * | 6/2001 | Adler et al. ................. | 704/500 |
| 6,314,398 B1 | * | 11/2001 | Junqua et al. .............. | 704/257 |
| 6,324,512 B1 | * | 11/2001 | Junqua et al. .............. | 704/275 |
| 6,338,055 B1 | * | 1/2002 | Hagmann et al. ............ | 707/2 |
| 6,342,901 B1 | * | 1/2002 | Adler et al. ................. | 345/700 |

* cited by examiner

*Primary Examiner*—Susan McFadden
(74) *Attorney, Agent, or Firm*—Trop, Pruner & Hu, P.C.

(57) ABSTRACT

A system allows a user to use conversational commands to control the recording of video programming. In some embodiments of the present invention, these natural language commands may be also utilized to manage a video library or to manage a schedule for video recordings. The video recording device may be an analog or digital system.

41 Claims, 14 Drawing Sheets

RECORDING INFORMATION IN RESPONSE TO SPOKEN REQUESTS

BACKGROUND

This invention relates generally to recording information in response to spoken requests.

A variety of recording devices are available for recording video information such as television programming. The video cassette recorder uses a serial memory in the form of a magnetic tape to record television programming. In addition, digital systems may be utilized to record video programming as well. These systems may record programming while it is being watched and allow replay of any portion of the stored information.

The control of video recording devices may be undertaken in response to a processor-based system such as a set-top box. The set-top box may sit atop a television receiver and may control both the receiver and other devices. In one conventional arrangement, the various video devices communicate with one another through infrared signals. In older devices, one-way infrared signals are utilized. Bi-directional protocols are now available which allow two-way communications.

For example, a remote control unit may communicate with both the television and the set-top box using infrared signals. The remote control may also communicate with the recording device and the recording device may in turn communicate with both the television and the set-top box using infrared signals. Generally, the exchange of programming data occurs over a cable connection that interconnects the set-top box, the television receiver and the recording device.

Systems of this type are now used in many homes. Generally, home users, having placed the television receiver in a living room, are averse to including elaborate keyboards for controlling the information provided to the television receiver or the set-top box.

Thus, conventionally, input information is provided through a hand-held remote control unit. The amount of information that may be provided through the remote control unit is limited by the somewhat condensed keyboard which is available on the remote control unit. The remote control unit may include arrow buttons and numerical buttons as well as an enter button but may conventionally not include a whole lot of other information. Therefore only limited amounts of information may be provided from the remote control using graphical user interfaces generally available through the use of the set-top box.

An electronic programming guide may be implemented by the set-top box. An electronic programming guide may provide a grid-like display which gives information about the times, titles and channels for various programs. Thus, the user can determine what program is on what channel at a given time. The user can move through the electronic programming guide using arrow buttons on the remote control to highlight various blocks in the guide and may eventually select a given program.

However, the ability to provide elaborate information such as the program title or the like through a remote control unit is relatively limited. To provide this kind of information may require using an on-screen keyboard and the arrow buttons on a remote control to select the letters one at a time to be "typed" on the on-screen keyboard. For most users, this is a tedious exercise.

Thus, there is a need for a better way to interact with video recording systems.

DETAILED DESCRIPTION

Figure 1:
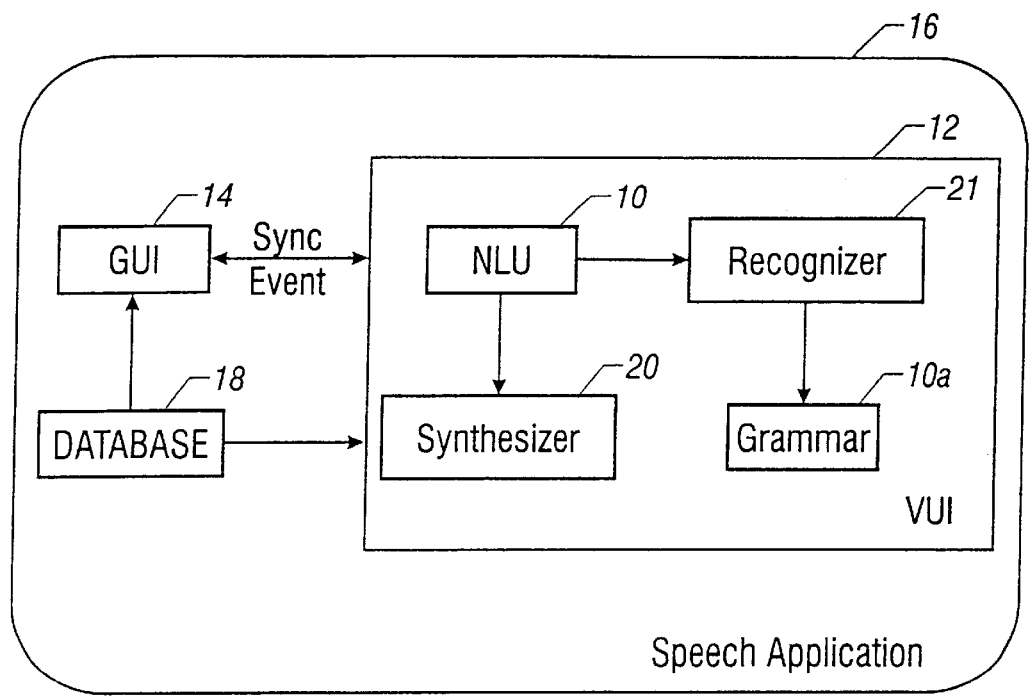
FIG. 1 is a schematic depiction of software modules utilized in accordance with one embodiment of the present invention.

As used herein, the term "conversational" as applied to a speech responsive system involves the ability of the system to respond to broadly or variously phrased requests, to use conversational history to develop the meaning of pronouns, to track topics as topics change and to use reciprocity. Reciprocity is the use of some terms that were used in the questions as part of the answer.

In some embodiments of the present invention, a graphical user interface may be utilized which may be similar to conventional electronic programming guides. This graphical user interface may include a grid-like display of television channels and times. In other embodiments, either no graphical user interface at all may be utilized or a more simplified graphical user interface may be utilized which is narrowed by the spoken requests that are received by the system.

In any case, the system uses a voice user interface (VUI) which interfaces between the spoken request for information from the user and the system. The voice user interface and a graphical user interface advantageously communicate with one another so that each knows any inputs that the other has received. That is, if information is received from the graphical user interface to provide focus to a particular topic, such as a television program, this information may be provided to the voice user interface to synchronize with the graphical user interface. This may improve the ability of the voice user interface to respond to requests for information since the system then is fully cognizant of the context in which the user is speaking.

The voice user interface may include a number of different states including the show selected, the audio volume, pause and resume and listen mode. The listen mode may include three listening modes: never, once and always. The never mode means that the system is not listening and the speech recognizer is not running. The once mode means that the system only listens for one query. After successfully recognizing a request, it returns to the never mode. The always mode means that the system will always listen for queries. After answering one query, the system starts listening again.

A listen state machine utilized in one embodiment of the present invention may reflect whether the system is listening to the user, working on what the user has said or has rejected what the user has said. A graphical user interface may add itself as a listener to the listen state machine so that it may reflect the state to the user. There are four states in the listen state machine. In the idle state, the system is not listening. In the listening state, the system is listening to the user. In the working state, the system has accepted what the user has said and is starting to act on it. In the rejected state, what the user said has been rejected by the speech recognition engine.

The state machine may be set up to allow barge in. Barge in occurs when the user speaks while the system is operating. In such case, when the user attempts to barge in because the user knows what the system is going to say, the system yields to the user.

Referring to FIG. 1, the system software may include an application 16 that may be an electronic programming guide application in one embodiment of the present invention. In the illustrated embodiment, the application includes a voice user interface 12 and the graphical user interface 14. The application 16 may also include a database 18 which provides information such as the times, programs, genre, and subject matter of various programs stored in the database 18. The database 18 may receive inquiries from the voice user interface 12 and graphical user interface 14. The graphical and voice user interface may be synchronized by synchronization events.

The voice user interface 12 may also communicate with a speech synthesizer 20 and a speech recognizer 21. In other embodiments of the present invention, output responses from the system may be provided on a display as text from other than as voice output responses from a synthesizer 20. The module 10 may include a grammar 10a which may utilized by the recognizer 21.

A state vector is a representation of the meaning of an utterance by a user. A state vector may be composed of a set of state variables. Each state variable has a name, a value and two flags. An in-context state vector may be developed by merging an utterance vector which relates to what the user said and a history vector. A history vector contains information about what the user said in the past together with information added by the system in the process of servicing a query. Thus, the in-context state vector may account for ambiguity arising, for example, from the use of pronouns. The ambiguity in the utterance vector may be resolved by resorting to a review of the history vector and particularly the information about what the user said in the past.

In any state vector, including utterance, history or in-context state vectors, the state variables may be classified as SELECT or WHERE variables (borrowing the terms SELECT and WHERE from the SQL database language). SELECT variables represent information a user is requesting. In other words, the SELECT variable defines what the user wants the system to tell the user. This could be a show time, length or show description, as examples.

WHERE variables represent information that the user has supplied. A WHERE variable may define what the user has said. The WHERE variable provides restrictions on the scope of what the user has asked for. Examples of WHERE variables include show time, channel, title, rating and genre.

The query "When is X-Files on this afternoon?" may be broken down as follows:

Request: When (from "When is X-Files on this afternoon?")
Title: X-Files
Part_of_day_range: afternoon The request (when) is the SELECT variable. The WHERE variables include the other attributes including the title (X-Files) and the time of day (afternoon).

The information to formulate responses to user inquiries may be stored in a relational database in one embodiment of the present invention. A variety of software languages may be used. By breaking a query down into SELECT variables and WHERE variables, the system is amenable to programming in well known database software such as Structured Query Language (SQL). SQL is standard language for relational database management systems. In SQL, the SELECT variable selects information from a table. Thus, the SELECT variable provides the list of column names from a table in a relational database. The use of a WHERE command further limits the selected information to particular rows of the table. Thus, a bare SELECT command may provide all the rows in a table and the combination of a SELECT and a WHERE command may provide less than all the row of a table, including only those items that are responsive to both the SELECT and the WHERE variables. Thus, by resolving spoken queries into SELECT and WHERE aspects, the programming may be facilitated in some embodiments of the present invention.

Figure 2:
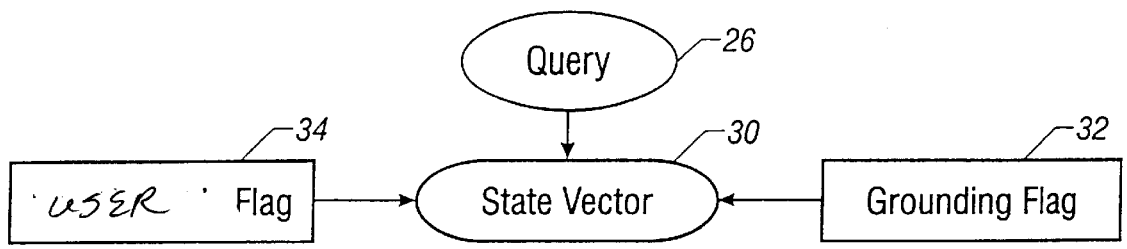
FIG. 2 is a schematic representation of the generation of a state vector from components of a spoken query and from speech generated by the system itself in accordance with one embodiment of the present invention.

Referring to FIG. 2 a user request or query 26 may result in a state vector 30 with a user flag 34 and a grounding flag 32. The user flag 34 indicates whether the state variable originated from the user's utterance. The grounded flag 32 indicates if the state variable has been grounded. A state variable is grounded when it has been spoken by the synthesizer to the user to assure mutual understanding. The VUI may repeat portions of the user's query back to the user in its answer.

Grounding is important because it allows the system to give feedback to the user about whether the system's speech recognition was correct. For example, consider the following spoken interchange:

1. User: "Tell me about X-Files on Channel 58".
2. System: "The X-Files is not on Channel 50".
3. User: "Channel 58".
4. System: "On Channel 58, an alien . . . "

At utterance number 1 all state variables are flagged as from the user and not yet grounded. Notice that the speech recognizer confused fifty and fifty-eight. At utterance number 2, the system has attempted to repeat the title and the channel spoken by the user and they are marked as grounded. The act of speaking parts of the request back to user lets the user know whether the speech recognizer has made a mistake. Grounding enables correction of recognition errors without requiring re-speaking the entire utterance. At utterance number 3, the user repeats "58" and the channel is again ungrounded. At utterance number 4, the system speaks the correct channel and therefore grounds it.

Figure 3:
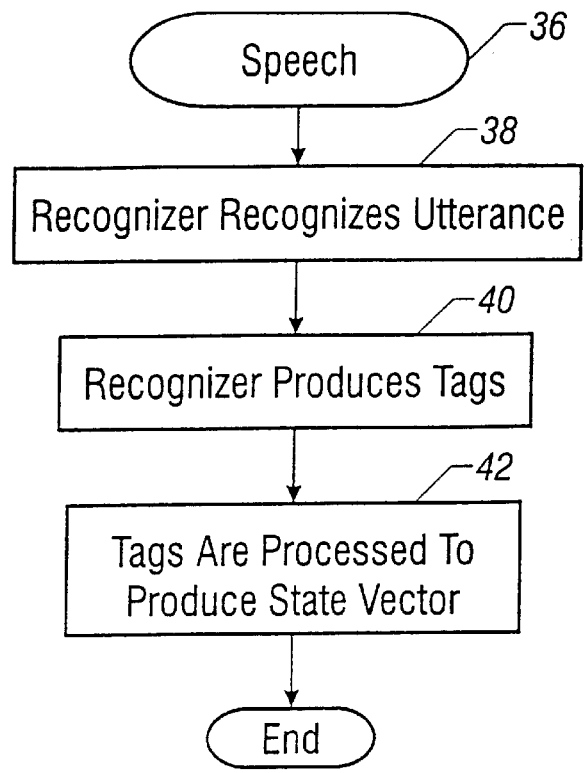
FIG. 3 is a flow chart for software for providing speech recognition in accordance with one embodiment of the present invention.

Turning next to FIG. 3, software 36 for speech recognition involves the use of an application program interface (API) in one embodiment of the present invention. For example, the JAVA speech API may be utilized in one embodiment of the present invention. Thus, as indicated in block 38, initially the API recognizes an utterance as spoken by the user. The API then produces tags as indicated in block 40. These tags are then processed to produce the state vector as indicated in block 42.

In one embodiment of the present invention, the JAVA speech API may be the ViaVoice software available from IBM Corporation. Upon recognizing an utterance, the JAVA speech API recognizer produces an array of tags. Each tag is a string. These strings do not represent the words the user spoke but instead they are the strings attached to each production rule in the grammar. These tags are language independent strings representing the meaning of each production rule. For example, in a time grammar, the tags representing the low order minute digit may include text which has no meaning to the recognizer. For example, if the user speaks "five", then the recognizer may include the tag "minute: 5" in the tag array.

Figure 4:
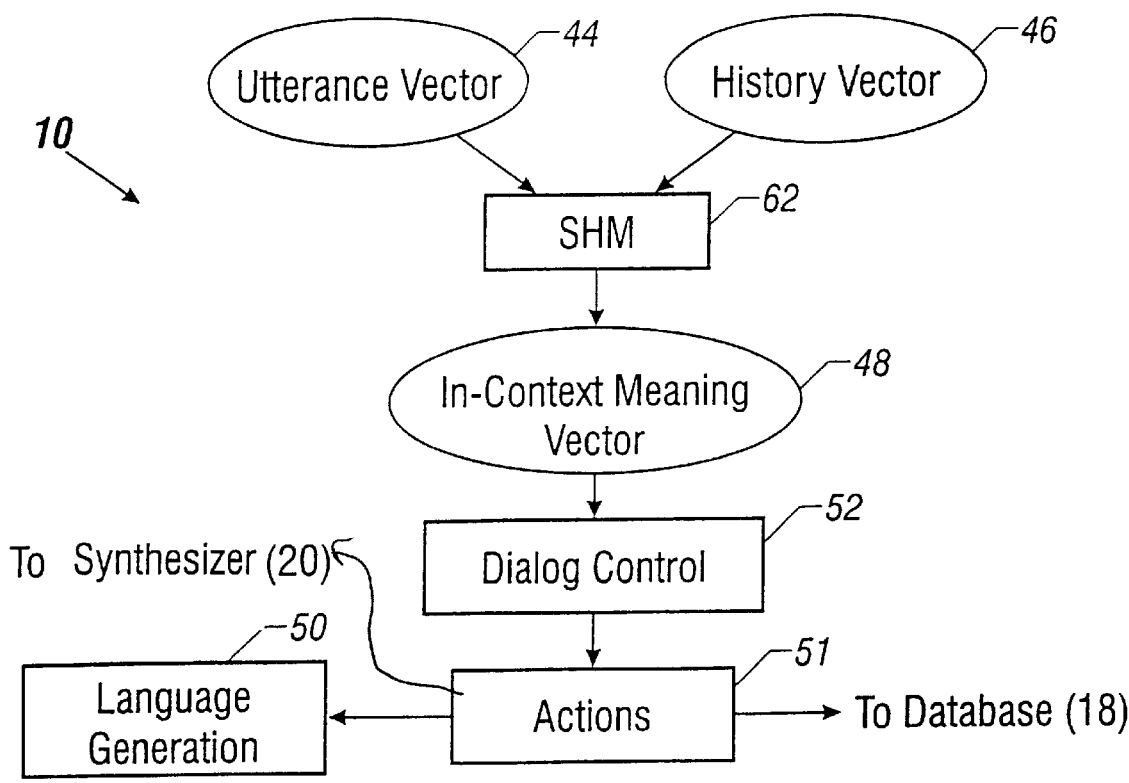
FIG. 4 is a schematic depiction of the operation of one embodiment of the present invention including the generation of in-context meaning and dialog control.

The natural language understanding (NLU) unit 10 develops what is called an in-context meaning vector 48 indicated in FIG. 4. This is a combination of the utterance vector developed by the recognizer 21 together with the history vector 46. The history vector includes information about what the user said in the past together with information added by the system in the process of servicing a query. The utterance vector may be a class file in embodiment using JAVA. The history vector 46 and a utterance vector 44 may be merged by structural history management software 62 to create the in-context meaning vector 48. The history, utterance and in-context meaning vectors are state vectors.

The in-context meaning vector 48 is created by decoding and replacing pronouns which are commonly used in conversational speech. The in-context meaning vector is then used as the new history vector. Thus, the system decodes the pronouns by using the speech history vector to gain an understanding of what the pronouns mean in context.

The in-context meaning vector 48 is then provided to dialog control software 52. The dialog control software 52 uses a dialog control file to control the flow of the conversation and to take certain actions in response to the in-context meaning vector 48.

These actions may be initiated by an actions object 51 that communicates with the database 18 and a language generator module 50. Prior to the language generator module 50 the code is human language independent. The module 50 converts from a computer format to a string to a particular human understood language, like English. The action object 51 may call the synthesizer 20 to generate speech. The actions object 51 may have a number of methods (see Table I infra).

Figure 5:
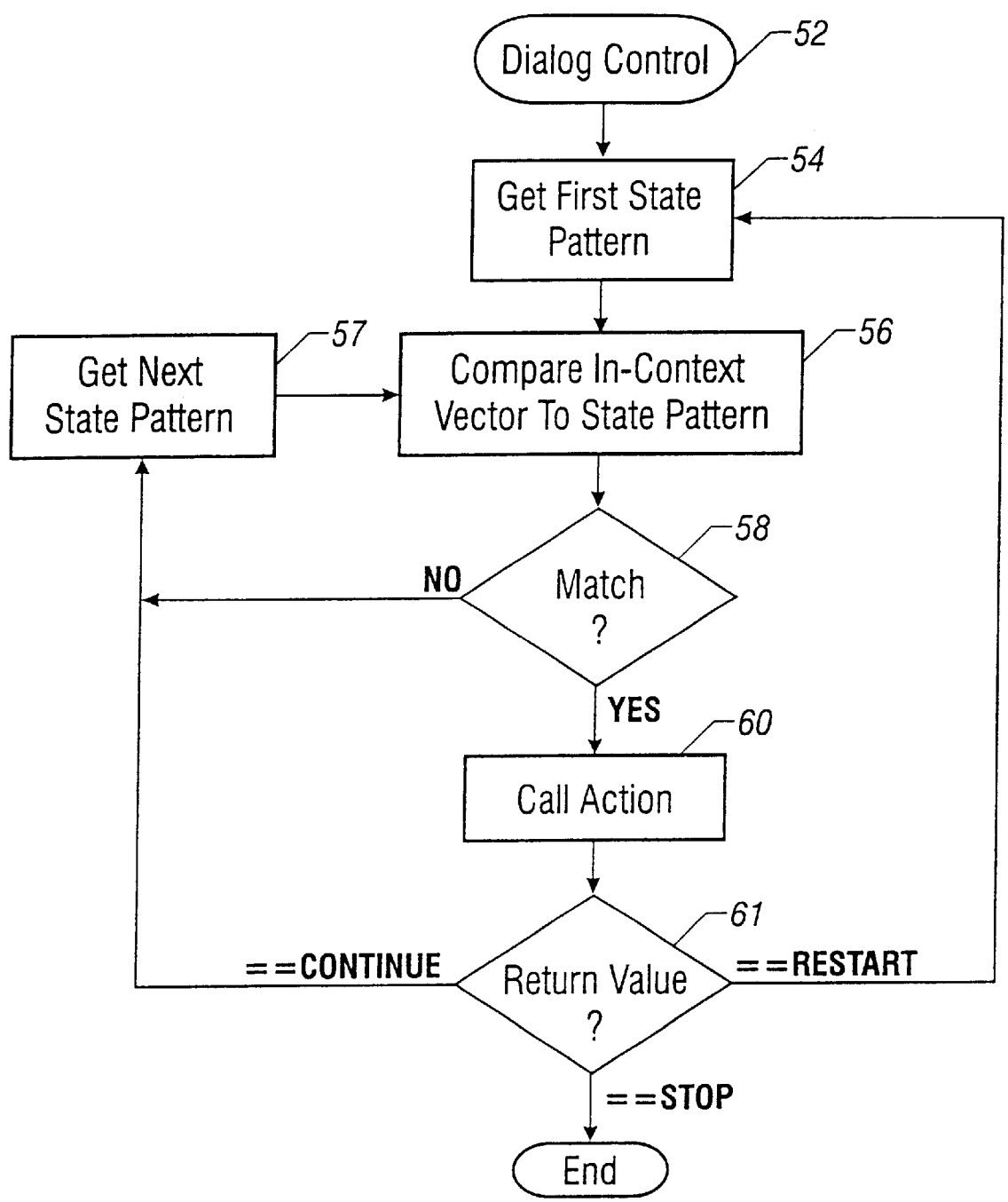
FIG. 5 is a flow chart for software for implementing dialog control in accordance with one embodiment of the present invention.

Thus, referring to FIG. 5, the dialog control software 52 initially executes a state control file by getting a first state pattern as indicated in block 54 in one embodiment of the invention. Dialog control gives the system the ability to track topic changes.

The dialog control software 52 uses a state pattern table (see Table I below) in one embodiment of the present invention. Each row in the state pattern table is a state pattern and a function. The in-context meaning vector 48 is compared to the state pattern table one row at a time going from top to bottom (block 56). If the pattern in the table row matches the state vector (diamond 58), then the function of that row is called (block 60). The function is also called a semantic action.

Each semantic action can return one of three values: CONTINUE, STOP and RESTART as indicated at diamond 61. If the CONTINUE value is returned, the next state pattern is obtained, as indicated at block 57 and the flow iterates.

If the RESTART value is returned, the system returns to the first state pattern (block 54). If the STOP value is returned, the system's dialog is over and the flow ends.

The action may do things such as speak to the user and perform database queries. Once a database query is performed, an attribute may be added to the state vector which has the records returned from the query as a value. Thus, the patterns consist of attribute, value pairs where the attributes in the state pattern table correspond to the attributes in the state vector. The values in the pattern are conditions applied to the corresponding values in the state vector.

TABLE I

| 1 | Request | Title | Channel | Time | nfound | function |
|---|---------|-------|---------|------|--------|----------|
| 2 | Help |  |  |  |  | giveHelp |
| 3 | Tv_on |  |  |  |  | turnOnTV |
| 4 | Tv_off |  |  |  |  | turnOffTV |
| 5 | tune |  | exists |  |  | tuneTV |
| 6 |  |  |  | not exists |  | defaultTime |
| 7 |  |  |  |  |  | checkDBLimits |
| 8 |  |  |  |  |  | queryDB |
| 9 |  |  |  |  | 0 | relaxConstraints |
| 10 |  |  |  |  | −1 | queryDB |
| 11 |  |  |  |  | 0 | saySorry |
| 12 |  |  |  |  | 1 | giveAnswer |
| 13 |  |  |  |  | >1 | giveChoice |

Thus, in the table above, the state patterns at lines 2–5 are basic functions such as help, turn the television on or off and tune the television and all return a STOP value.

In row six, the state pattern checks to see if the time attribute is defined. If not, it calls a function called defaultTime( ) to examine the request, determine what the appropriate time should be, and set the time attribute, and return a CONTINUE value.

In row seven, the pattern is empty so the function checkDBLlimit( ) is called. A time range in the user's request is checked against the time range spanned by the database. If the user's request extends beyond the end of the database, the user is notified, and the time is trimmed to fit within the database range. A CONTINUE value is returned.

Row eight calls the function queryDB( ). QueryDB( ) transforms the state vector into an SQL query, makes the query, and then sets the NFOUND variable to the number of records retrieved from the database. The records returned from the query are also inserted into the state vector.

At row nine a check determines if the query done in row eight found anything. For example, the user may ask, "When is the X-Files on Saturday?", when in fact the X-Files is really on Sunday. Rather than telling the user that the X-Files is not on, it is preferable that the system say that "the X-Files is not on Sunday, but is on Sunday at 5:00 p.m". To do this, the constraints of the user's inquiry must be relaxed by calling the function relaxConstraints( ). This action drops the time attribute from the state vector. If there were a constraint to relax, relaxConstraints( ) sets NFOUND to −1. Otherwise, it leaves it at zero and returns a CONTINUE value.

Row 10 causes a query to be repeated once the constraints are relaxed and returns a CONTINUE value. If there were no records returned from the query, the system gives up and tells the user of its failure in row 11 and returns a STOP value. In row 12 an answer is composed for the user if one record or show was found and a STOP value is returned.

In row 13 a check determines whether more than one response record exists. Suppose X-Files is on both channels 12 and 25. GiveChoice( ) tells the user of the multiple channels and asks the user which channel the user is interested in. GiveChoice( ) returns a STOP value (diamond 61 FIG. 5), indicating that the system's dialog turn is over. If the user tells the system a channel number, then the channel number is merged into the previous inquiry stored in history.

The system tracks topic changes. If the user says something that clears the history, the state pattern table simply responds to the query according to what the user said. The state pattern table responds to the state stored in the in-context vector.

Figure 6:
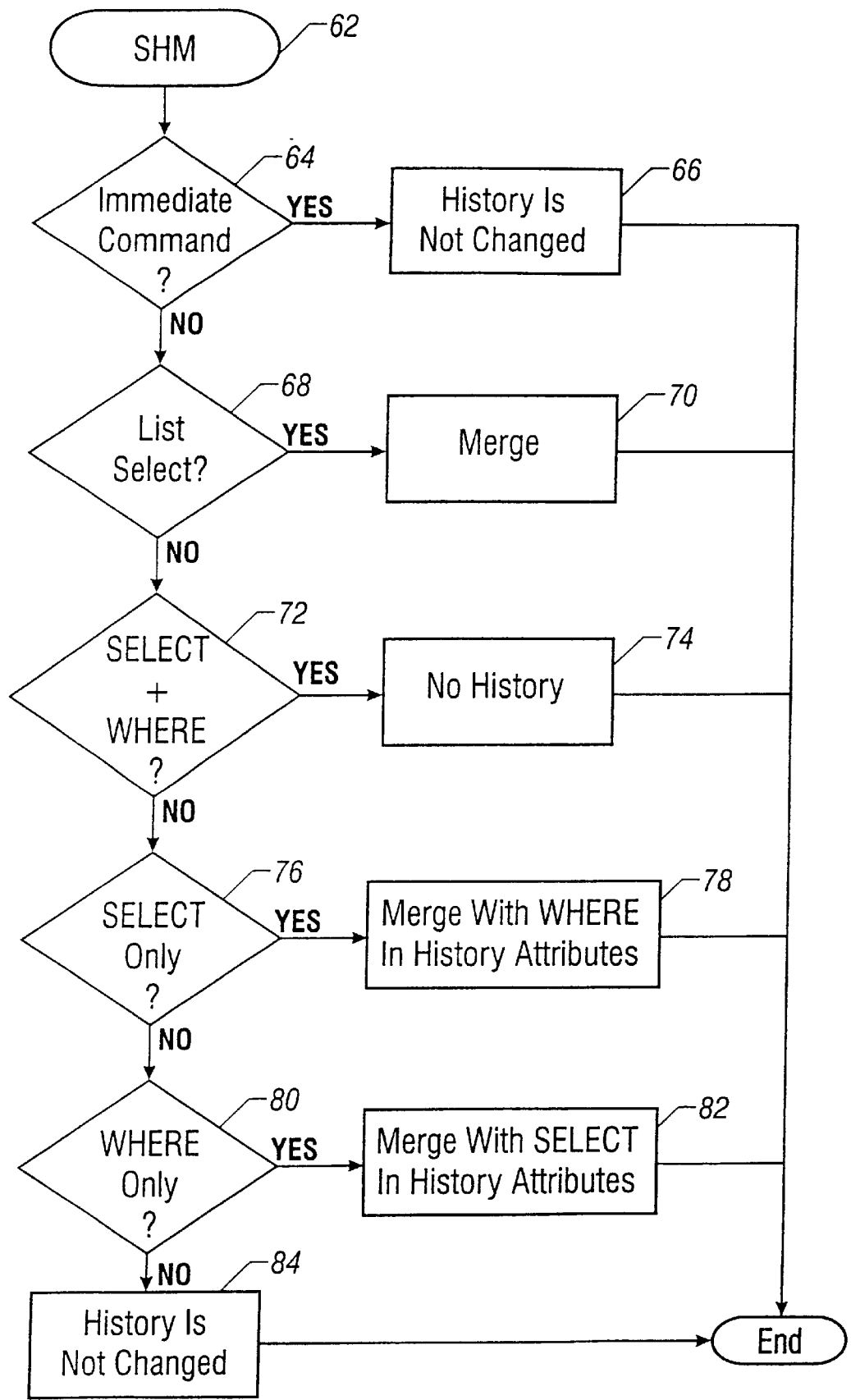
FIG. 6 is a flow chart for software for implementing structure history management in accordance with one embodiment of the present invention.

Turning next to FIG. 6, the software 62 implements structural history management (SHM). Initially the flow determines at diamond 64 whether an immediate command is involved. Immediate commands are utterances that do not query the database but instead demand immediate action. They do not involve pronouns and therefore do not require the use of structural history. An example would be "Turn on the TV". In some cases, an immediate command may be placed between other types of commands. The immediate command does not effect the speech history. This permits the following sequence of user commands to work properly:

1. "When is X-Files on",
2. "Turn on the TV",
3. "Record it".

The first sentence puts the X-Files show into the history. The second sentence turns on the television. Since it is an immediate command, the second sentence does not erase the history. Thus, the pronoun "it" in the record command (third sentence) can be resolved properly.

Thus, referring back to FIG. 6, if an immediate command is involved, the history is not changed as indicated in block 66. Next, a check at diamond 68 determines whether a list selection is involved. In some cases, a query may be responded to with a list of potential shows and a request that the user verbally select one of the listed shows. The system asks the user which title the user is interested in. The user may respond that it is the Nth title. If the user utterance selects a number from a list, then the system merges with history as indicated in block 70. Merging with history refers to an operation in which the meaning derived from the speech recognizer is combined with history in order to decode implicit references such as the use of pronouns.

Next, a check at diamond 72 determines whether the query includes both SELECT and WHERE variables. If so, history is not needed to derive the in-content meaning as indicated in block 74.

Otherwise, a check determines whether the utterance includes only SELECT (diamond 76) or only WHERE (diamond 80) variables. If only a SELECT variable is involved, the utterance vector is merged with the history vector (block 78).

If an utterance has only a where part, then the in-context meaning is the same as the history with the utterance's where values inserted into the history. If the utterance has only a request part, then the in-context meaning is the same as the history with the utterance's request inserted into the history vector. If the utterance has neither a request or a where part, then the in-context meaning is the same as the history. If the utterance has both parts, then the in-context meaning is the same as the utterance. The in-context meaning becomes the new value of the history.

Similarly, if the utterance includes only a WHERE variable, the utterance is merged with history as indicated in block 82. If none of the criteria set forth in diamonds 64, 68, 72, 76 or 80 apply, then the history is not changed as indicated in block 84.

As an example, assume that the history vector is as follows:

Request: When (from "When is X-Files on this afternoon?")
Title: X-Files
Part_of_day_range: afternoon.

Thus the history vector records a previous query "When is X-Files on this afternoon?". Thereafter, the user may ask "What channel is it on?" which has the following attributes:

Request: Channel (from "What channel is it on?")

Thus, there is a SELECT attribute but no WHERE attribute in the user's query. As a result, the history vector is needed to create an in-context or merged meaning as follows:

Request: Channel (from "What channel is X-Files on this afternoon?")
Title: X-Files
Part_of_day_range: afternoon.

Notice that the channel request overwrote the when request.

As another example, assume the history vector includes the question "What is X-Files about?" which has the following attributes:

Request: About (from "What is X-Files about?")
Title: X-Files

Assume the user then asks "How about Xena?" which has the following attributes:

Title: Xena (from "How about Xena?")

The query results in an in-context meaning as follows when merged with the history vector:

Request: About (from "What is Xena about?")
Title: Xena.

Since there was no SELECT variable obtainable from the user's question, the SELECT variable was obtained from the historical context (i.e. from the history vector). Thus, in the first example, the WHERE variable was missing and in the second variable the SELECT variable was missing. In each case the missing variable was obtained from history to form an understandable in-context meaning.

Figure 7:
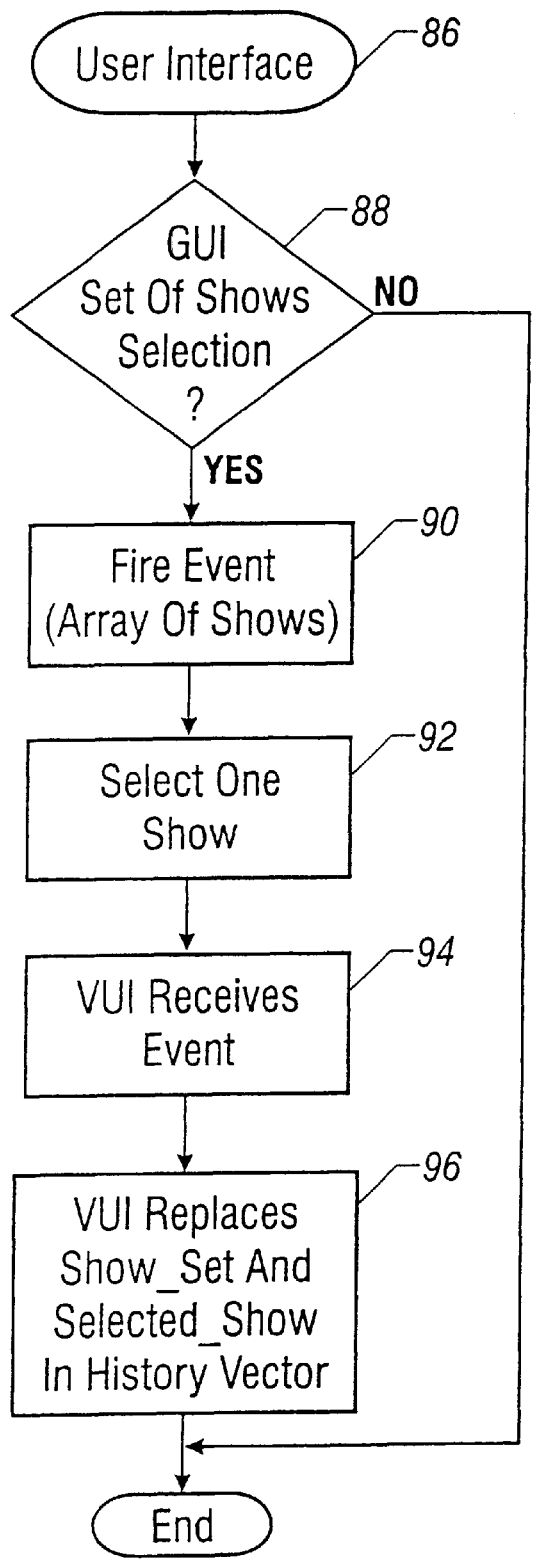
FIG. 7 is flow chart for software for implementing an interface between a graphical user interface and a voice user interface in accordance with one embodiment of the present invention.

The software 86 shown in FIG. 7, coordinates actions between the graphical user interface and the voice user interface in one embodiment of the invention. A show is a television show represented by a database record. A show is basically a database record with attributes for title, start time, end time, channel, description, rating and genre.

More than one show is often under discussion. A collection of shows is represented by a ShowSet. The SHOW_SET attribute is stored in the meaning vector under the SHOW_SET attribute. If only one show is under discussion, then that show is the SHOW_SET.

If the user is discussing a particular show in the SHOW_SET, that show is indicated as the SELECTED_SHOW attribute. If the attribute is −1, or missing from the meaning vector, then no show in the SHOW_SET has been selected. When the voice user interface produces a ShowSet to answer a user's question, SHOW_SET and SELECTED_SHOW are set appropriately. When a set of shows is selected by the graphical user interface 14, it fires an event containing an array of shows. Optionally, only one of these shows may be selected. Thus, referring to diamond 88, if the user selects a set of shows, an event is fired as indicated in block 90. In block 92, one of those shows may be selected. When the voice user interface 12 receives the fired event (block 94), it simply replaces the values of SHOW_SET and SELECTED_SHOW (block 96) in the history vector with those of a synchronization event.

When the voice user interface 12 translates a meaning vector into the appropriate software language, the statement is cached in the history vector under the attributes. This allows unnecessary database requests to be avoided. The next time the history vector is translated, it is compared against the cached value in the history vector. If they match, there is no need to do the time consuming database query again.

The conversational model 100 (FIG. 8) implemented by the system accounts for two important variables in obtaining information about television programming: time and shows. A point in time may be represented by the JAVA class calendar. A time range may be represented by a time range variable. The time range variable may include a start and end calendar. The calendar is used to represent time because it provides methods to do arithmetic such as adding hours, days, etc.

The time range may include a start time and end time either of which may be null indicating an open time range. In a state vector, time may be represented using attributes such as a WEEK_RANGE which includes last, this and next; DAY_RANGE which includes now, today, tomorrow, Sunday, Monday. . . , Saturday, next Sunday . . . , last Sunday . . . , this Sunday . . . ; PART_OF_DAY_RANGE which includes this morning, tonight, afternoon and evening; HOUR which may include the numbers one to twelve; MINUTE which may include the numbers zero to fifty-nine; and AM_PM which includes AM and PM.

Thus, the time attributes may be composed to reflect a time phase in the user's utterance. For example, in the question, "Is Star Trek on next Monday at three in the afternoon?" may be resolved as follows:

Request: When
Title: Star Trek
Day_Range: Next Monday
Part_of_Day_Range: Afternoon
Hour: 3

Since the state vector is a flat data structure in one embodiment of the invention, it is much simpler and uses simpler programming. The flat data structure is made up of attribute, value pairs. For example, in the query "When is X-Files on this afternoon?" the request is the "when" part of the query. The request is an attribute whose value is "when". Similarly, the query has a title attribute whose value is the "X-Files". Thus, each attribute, value pair includes a name and a value. The data structure may be simplified by ensuring that the values are simple structures such as integers, strings, lists or other database records as opposed to another state vector.

In this way, the state vector contains that information needed to compute an answer for the user. The linguistic structure of the query, such as whether it is a phrase, a clause or a quantified set, is deliberately omitted in one embodiment of the invention. This information is not necessary to compute a response. Thus, the flat data structure provides that information and only that information needed to formulate a response. The result is a simpler and more useful programming structure.

Figure 8:
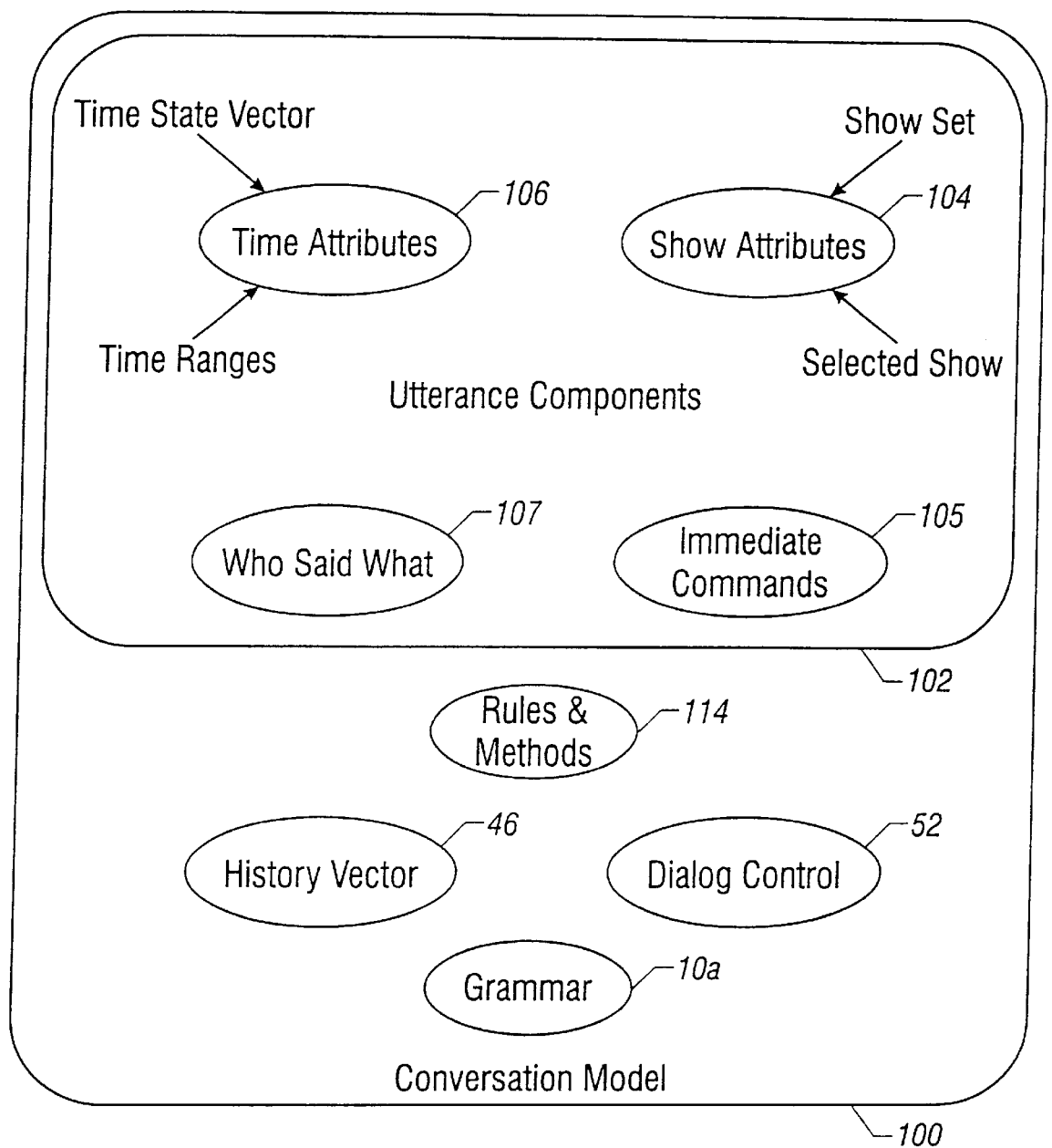
FIG. 8 is a conversation model implemented in software in accordance with one embodiment of the present invention.
Figure 8A:
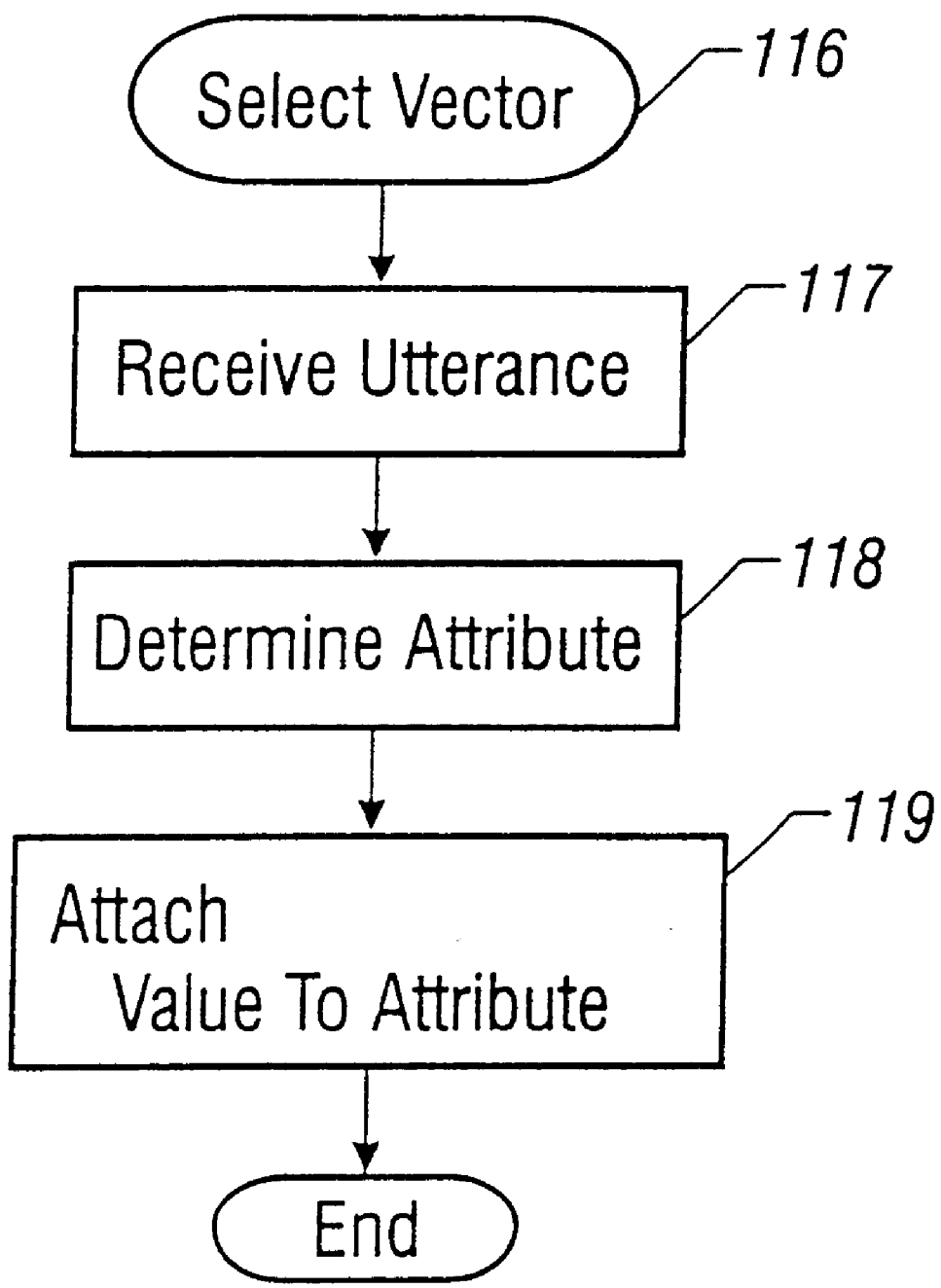
FIG. 8A is a flow chart for software for creating state vectors in one embodiment of the present invention.

The software 116 for creating the state vector, shown in FIG. 8A in accordance with one embodiment of the present invention, receives the utterance as indicated in block 117. An attribute of the utterance is determined as indicated in block 118. A non-state vector value is then attached to the attribute, value pair, as indicated in block 119.

Thus, referring again to FIG. 8, the conversation model 100 may include time attributes 106 which may include time ranges and a time state vector. Show attributes 104 may include a show set and selected show. The time attributes and show attributes are components of an utterance. Other components of the utterance may be "who said what" as indicated at 107 and immediate commands as indicated at 105. The conversation model may also include rules and methods 114 discussed herein as well as a history vector 46 dialog control 52 and a grammar 10a.

The methods and rules 114 in FIG. 8 may include a number of methods used by the unit 10. For example, a method SetSelected( ) may be used by the unit 10 to tell the voice user interface 12 what shows have been selected by the graphical user interface 14. The method Speak( ) may be used to give other parts of the system, such as the graphical user interface 14, the ability to speak. If the synthesizer 20 is already speaking, then a Speak( ) request is queued to the synthesizer 20 and the method returns immediately.

The method SpeakIfQuiet( ) may be used by the unit 10 to generate speech only if the synthesizer 20 is not already speaking. If the synthesizer is not speaking, the text provided with the SpeakIfQuiet( ) method may be given to the synthesizer 20. If the synthesizer is speaking, then the text may be saved, and spoken when the synthesizer is done speaking the current text.

A natural language module 10, may also be used to control the recording of video information. Thus, software that implements an electronic program guide function may also be utilized to control the recording of video programming by a video recording device.

Figure 9:
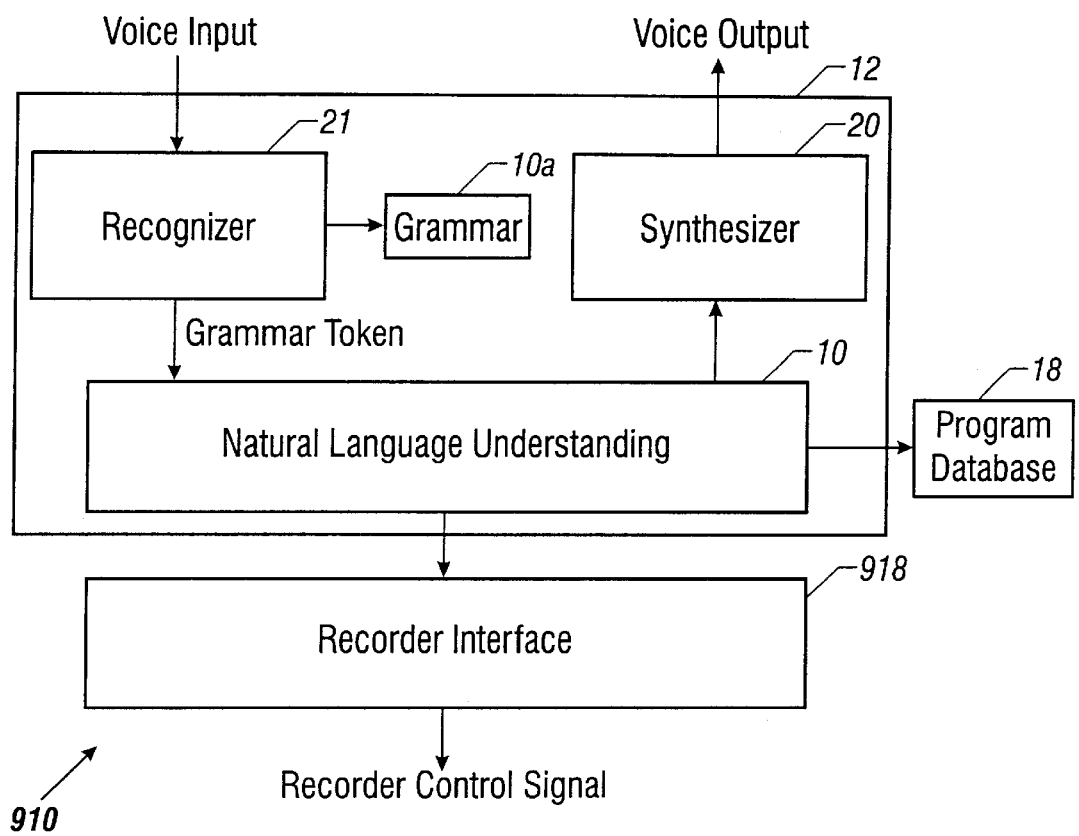
FIG. 9 is schematic depiction of software modules utilized in accordance with another embodiment of the present invention.

Referring to FIG. 9, a voice user interface 12 may include a grammar 10a as described previously. The recognizer 21 receives a voice input and attempts to match the words in the voice input to the words contained in the grammar 10a. When a match is identified, a grammar token may be issued by the recognizer 21 to a natural language understanding unit 10. The token identifies the particular phrase from the grammar which was identified in the voice input. The natural language understanding unit 10 may provide a voice output through a voice synthesizer 20 in one embodiment of the present invention.

The natural language understanding unit 10 works with a program database 18. The program database 917 may be provided from a number of sources. In one embodiment of the present invention, the program database information is downloaded from video programming content providers.

The natural language understanding unit 10 converts the grammar token into a command recognized by a video recorder interface 918. The video recorder interface 918 then issues a recorder control signal in a format acceptable by the video recording device. In some embodiments of the present invention, the recorder control signal may be issued by a infrared interface. However, other formats may be utilized including a cable connection or a radio wave interface.

Figure 10:
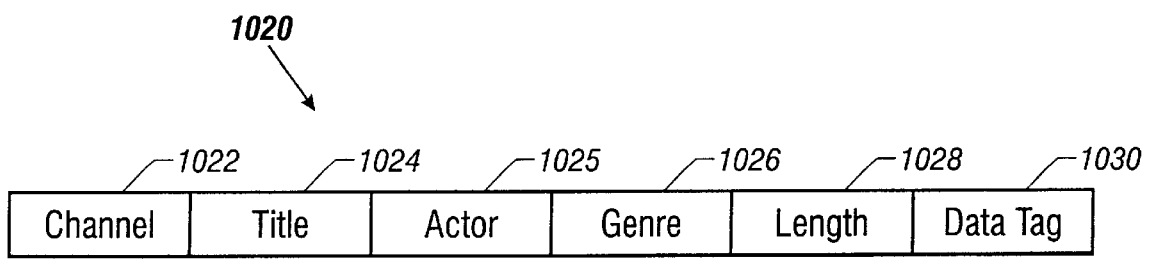
FIG. 10 is a data format which may be utilized in connection with the software module shown in FIG. 9.

Information about each of a plurality of programs may be derived from the program database 918 to produce a file 1020 shown in FIG. 10. For example, in one embodiment of a present invention, a file 1020 may include a data tag 1030 which provides a reference or pointer to the location where the data forming the actual program is stored. The file 1020 may include information about the program including the channel 1022, title 1024, actors 1025, genre 1026, and length 1028, as examples. Of course, other information may be included as well.

In one embodiment of the present invention, the files 1020 form a searchable database which may be searched to obtain information orally requested by the user. In an embodiment in which the file is automatically provided from the content provider, the system 910 advantageously provides an automatic indexing of the video data for each program stored by the system.

Figure 11:
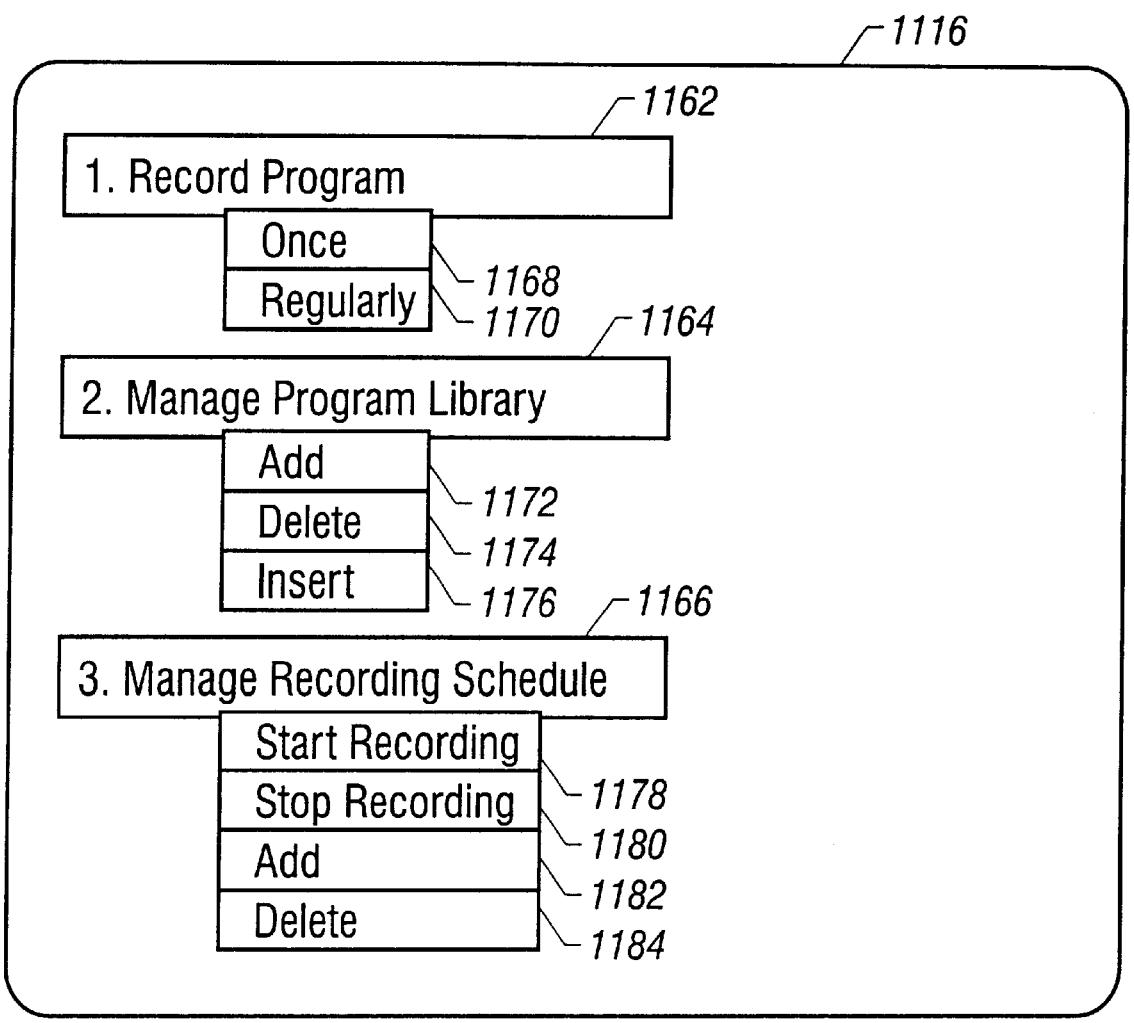
FIG. 11 is a depiction of a graphical user interface which may be utilized in connection with one embodiment in accordance with FIG. 9.

A graphical user interface 1116 shown in FIG. 11 is useful in controlling a video recording device. The interface 1116 may include a number of functions such as a record program function selected through an icon 1162, a manage program library function implemented through an icon 1164 and a manage recording schedule implemented by an icon 1166. Each of the icons 1162, 1164, 1166 may implement a dropdown menu in one embodiment of the present invention. Thus, each dropdown menu provides additional commands which may be selected through a remote control unit or by spoken commands to implement the additional function. For example, the record program function indicated by the icon 1162 may have a record once command selectable through an icon 1168 and record regularly command selectable through an icon 1170. Likewise, the manage program library function selectable through the icon 1164 may include an add command indicated by an icon 1172, a delete command indicated by an icon 1174, and an insert command indicated by an icon 1176, in one embodiment of the present invention. Finally, the manage recording schedule function indicated by the icon 1166 may include commands such as start recording, stop recording, add and delete which may be selected through icons 1178, 1180, 1182 and 1184.

The record program function enables the user to record a program identified through a voice query. For example, the user may ask the system to "Record Star Trek, The Next Generation". The system may then ask "Which Star Trek, The Next Generation do you want to record" and the user may indicate a Star Trek at a given day or a given time or ask that all the Star Trek, The Next Generation episodes be recorded whenever they occur.

The manage program library function allows the user to use conversational commands to manage a library of stored video programming. This library may be displayed as a graphical user interface. The user may issue voice commands to add a given title to the library, to delete a given title or to insert a given title at a given location within the library, as examples. The use of conversational commands avoids the need for the user to type elaborate information into the system to manage a database of stored recorded video files.

A schedule of recording operations may be managed using conversational commands as well. A user may wish to record a variety of programs at given times over a period of time. Instead of inputting these commands through the remote control unit, the user can manage the recording schedule through the conversational commands, illustrated in FIG. 11. For example, the system may respond to a voice command to no longer record the Sopranos or to add the X-Files to the recording schedule. The system may request further information like "When should the X-Files be recorded?" and the user may respond by saying once or regularly which would indicate that every episode is recorded automatically until further notice.

Figure 12:
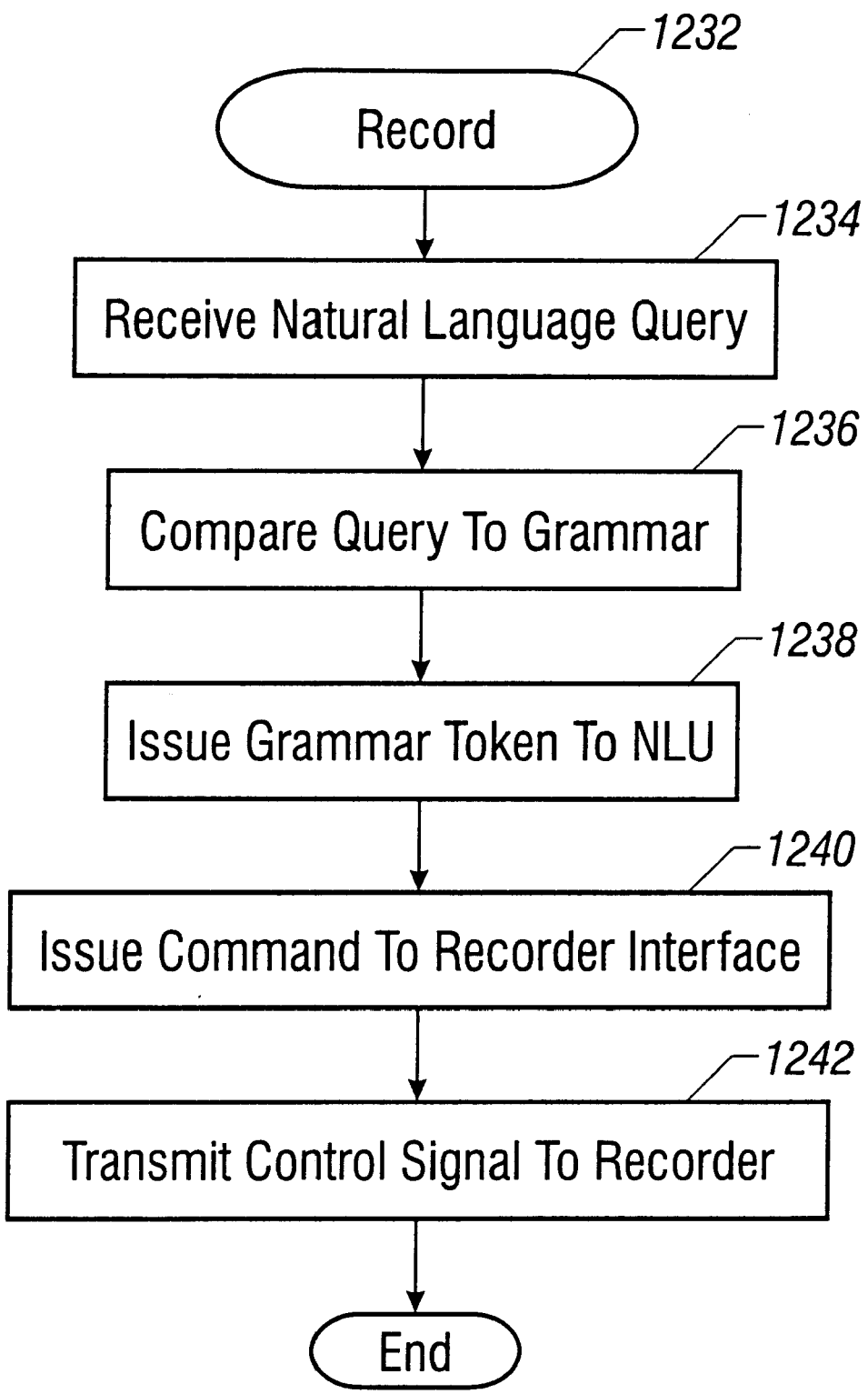
FIG. 12 is a flow chart for software for recording programs in response to natural language commands.

In accordance with one embodiment of the invention, software 1232 to record a program in response to a conversation request, shown in FIG. 12, begins by receiving a natural language query as indicated at block 1234. The query is then compared to the grammar as indicated in block 1236. A grammar token is issued to identify the particular grammar file that matched the natural language query as indicated in block 1238. The token is issued to the natural language understanding unit 10. A command is then issued by the natural language understanding unit 10 to the recorder interface 918 (FIG. 9) as indicated in block 1240. The recorder interface 918 then issues a control signal to the recording device as indicated in block 1242.

Figure 13:
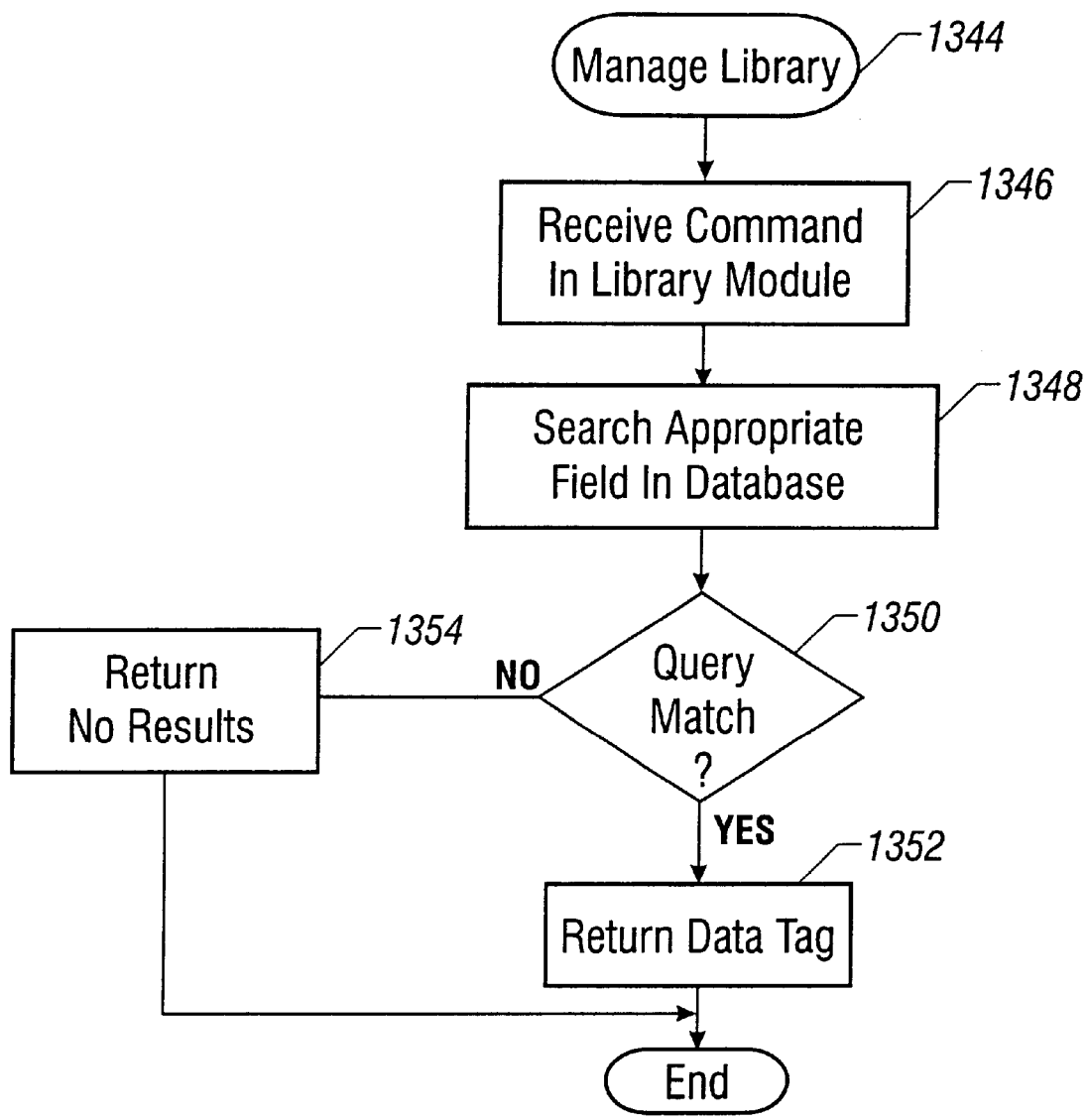
FIG. 13 is a flow chart for software for using natural language commands to manage a video library.

Turning next to FIG. 13, software 1344 for managing a library stored recorded programming, in accordance with on embodiment of the invention, begins by receiving a command in a software module responsible for maintaining the library records as indicated in block 1346. The appropriate fields in the database for each file may be searched. For example, in a file 1020 format of the type shown in FIG. 10, each of the fields 1022 through 1028 may be searched for a particular term recognized by the recognizer 912 as indicated in block 1348. If there is a match as determined at diamond 1350 the data tag 1030 (FIG. 10) for the particular responsive program may be returned as indicated by block 1252. Otherwise, a "no results" indication may be provided as suggested by block 1354.

Figure 14:
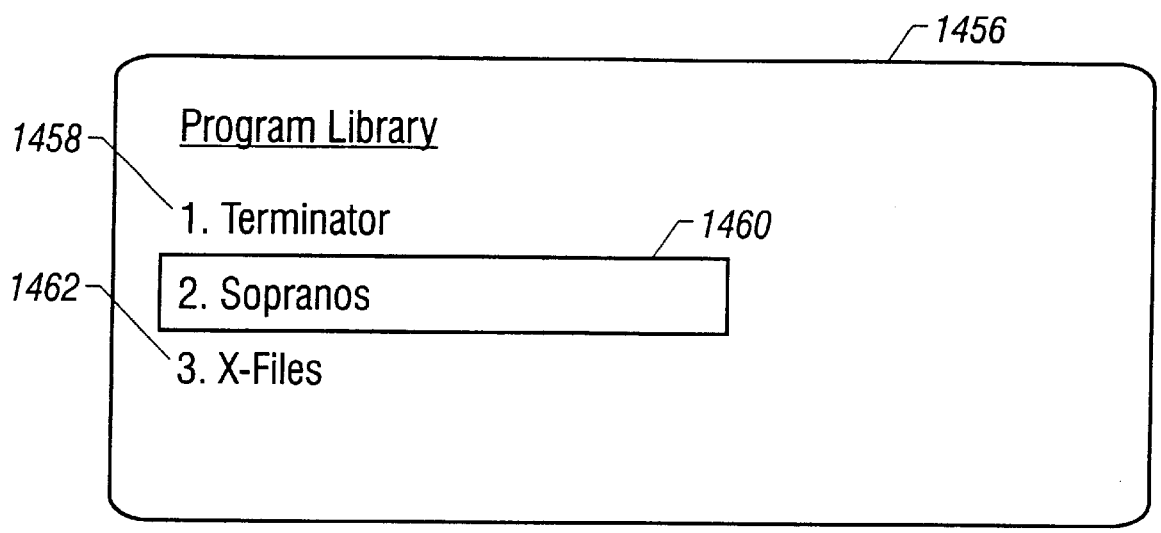
FIG. 14 is a graphical user interface which may be utilized in connection with the software shown in FIG. 13.

Thus, turning to FIG. 14, a graphical user interface 1456 may provide a listing of all the programs stored in the program library. For example, programs such as Terminator 1458 Sopranos 1460 and X-Files 1462 may be provided. In this case, the graphical user interface 1460 is highlighted. The system may search the data file 1020 associated with each of the entries in the program library to find information to respond to a user request. For example, a user may ask for shows about New Jersey and the system may identify responsive shows on the interface 1456 by highlighting, as indicated at 1460 the Sopranos title. The information necessary to identify the Sopranos may be gleaned from the description 1029 stored in the file 1020 associated with the Sopranos data file information in one embodiment of the invention.

Figure 15:
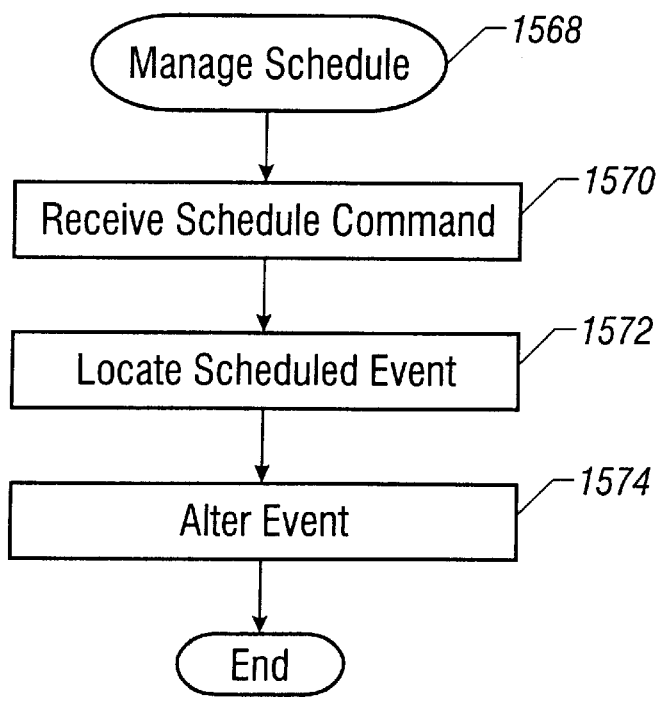
FIG. 15 is a flow chart for software that may be utilized to manage the recording schedules for video programming.

Software 1568 may manage a recording schedule by receiving a schedule change command as indicated in block 1570 of FIG. 15. The scheduled event may then be located at indicated in block 1572. That event may be altered as indicated in block 1574. Thus, the user may use the conversational capabilities of the system to modify the recording schedule without the need to use a remote control unit to enter data that may be awkward to enter using a remote control unit.

Figure 16:
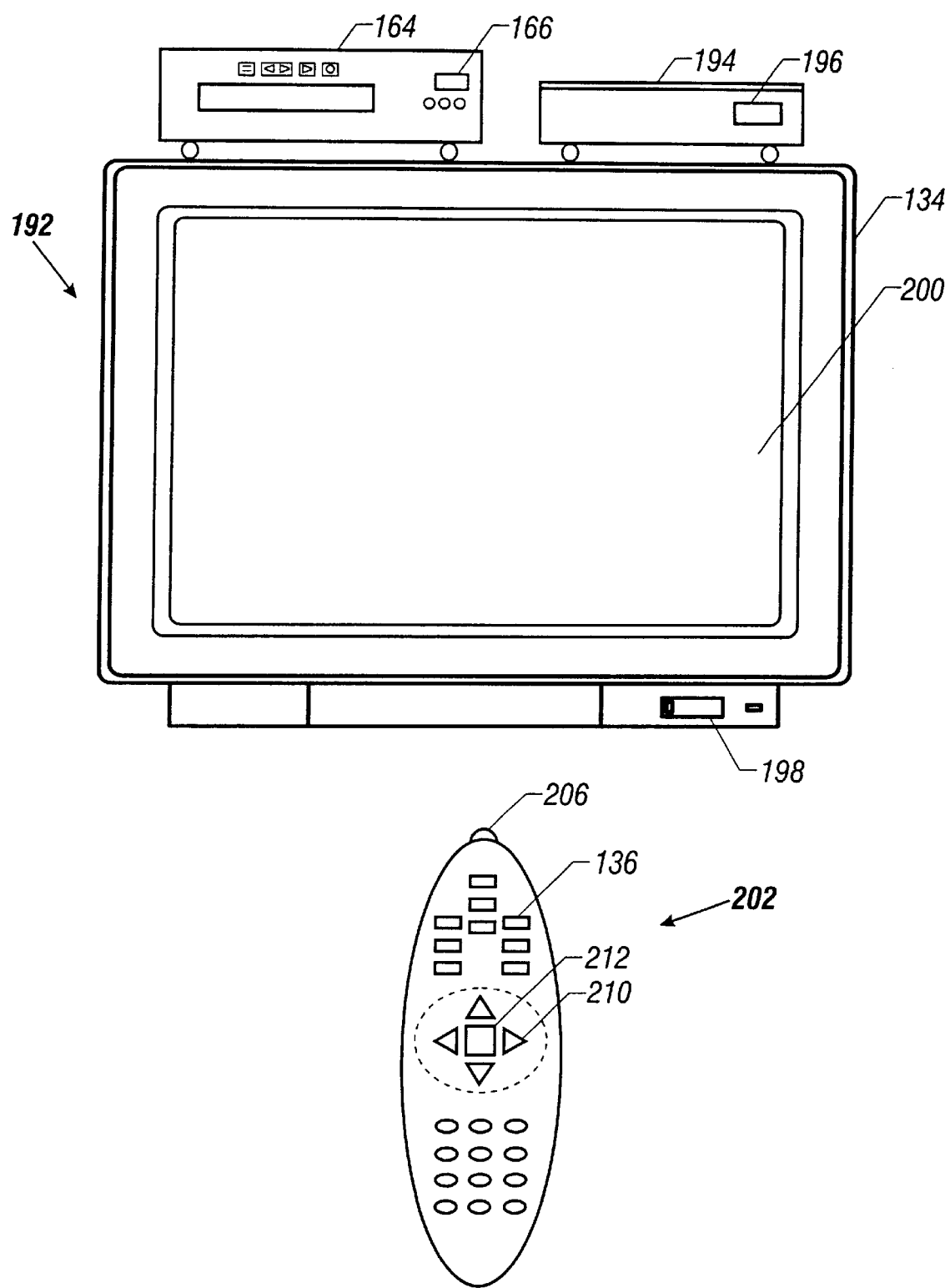
FIG. 16 is a front elevational view of one embodiment of the present invention.

As shown in FIG. 16, the system may include a television receiver with a display screen 200. A set-top computer system 194 may be positioned atop the display screen. A infrared interface 196 may be provided in connection with the computer 194. An infrared interface 198 may be provided on the television 134.

A recording device 164 may be also positioned in association with the receiver 134. The recording device 164 may be one which includes an infrared interface 166 as illustrated. A variety of recording devices may be utilized in connection with the present invention including those that make analog as well as digital recordings. For example, a conventional VCR may be utilized as well as a device which stores video programming in association with a digital storage media such as a random access memory. For example, a hard disk drive may be utilized to store video programming as is currently done in connection with the commercially available systems known as TiVo and available from TiVo, Inc., Sunnyvale, Calif.

The system may be controlled remotely by a remote control unit 202 which includes arrow control buttons 210 an enter button 212 and an infrared interface 206 in one embodiment of the invention. A microphone 136 may be provided within the remote control unit 202 to better receive the input voice commands with less interference from the television.

In some cases, using legacy systems, there may be problem with adequately determining the state of a device controlled by the remote control unit 202. This is particularly so where multiple remote control units are available for controlling various components. A variety of systems have been provided to overcome this deficiency. For example, with a bidirectional infrared protocol, this problem is easily overcome since the system may always maintain the state of each component.

Figure 17:
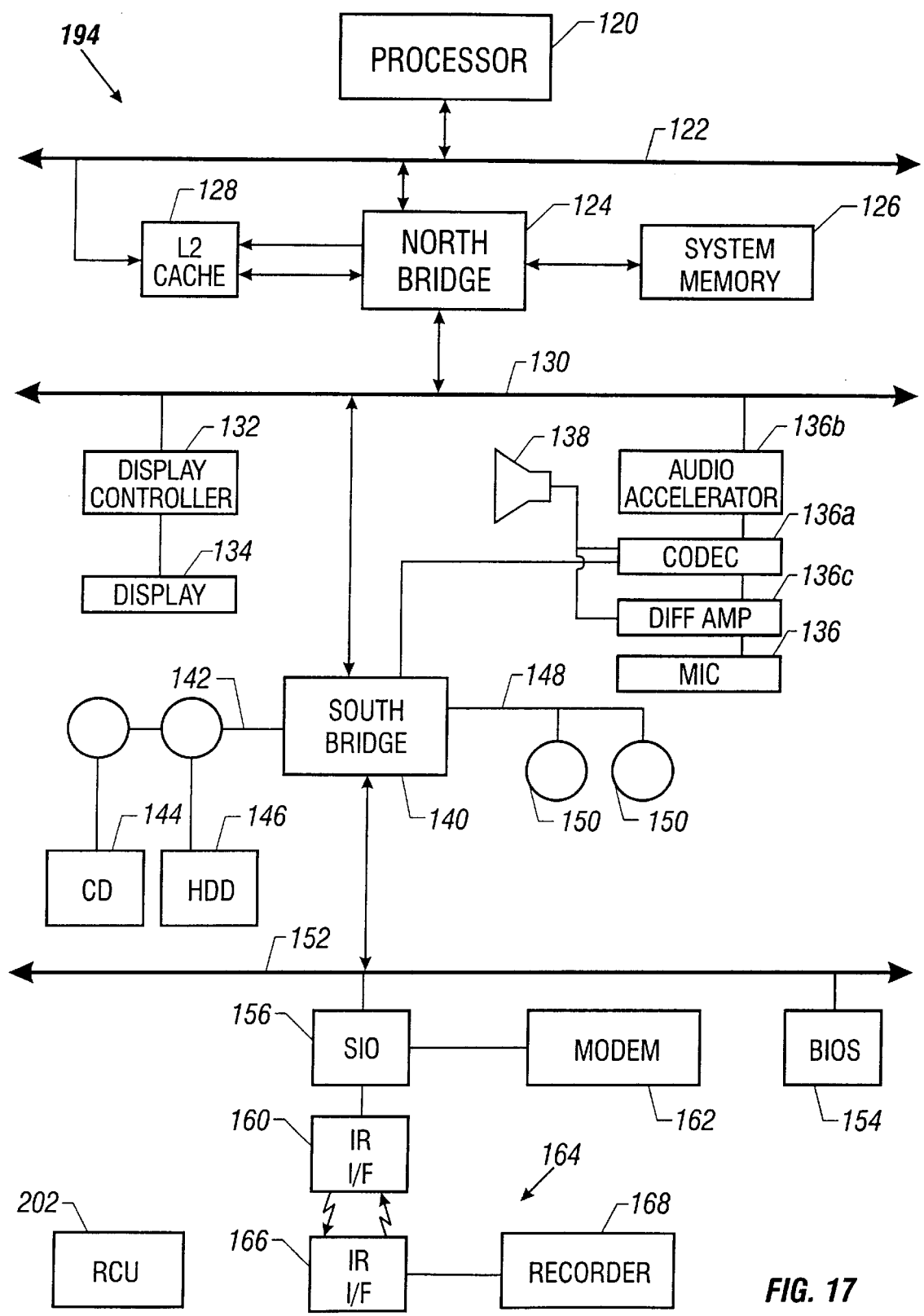
FIG. 17 is a schematic of hardware for implementing one embodiment of the present invention.

One embodiment of a processor-based system 194 for implementing the capabilities described herein, shown in FIG. 17, may include a processor 120 that communicates across a host bus 122 to a bridge 124 an L2 cache 128 and system memory 126. The bridge 124 may communicate with a bus 130 which could, for example, be a Peripheral Component Interconnect (PCI) bus in accordance with Revision 2.1 of the PCI Electrical Specification available from the PCI Special Interest Group, Portland, Oreg. 97214. The bus 130 in turn, may be coupled to a display controller 1732 which drives a display 134 in one embodiment of the invention.

The display 134 may be a conventional television. In such case, the hardware system shown in FIG. 17 may be implemented as a set-top box 194 as shown in FIG. 16. The set-top box 194 sits on and controls a conventional television display 134.

A microphone input 136 may lead to the audio codec (AC'97) 136*a* where it may be digitized and sent to memory through an audio accelerator 136*b*. The AC'97 specification is available from Intel Corporation (www.developer.intel.com/pc-supp/webform/ac97). Sound data generated by the processor 120 may be sent to the audio accelerator 136*b* and the AC'97 codec 136*a* and on to the speaker 138.

In some embodiments of the present invention, there may be a problem distinguishing user commands from the audio that is part of the television program. In some cases, a mute button may be provided, for example in connection with a remote control 202 in order to mute the television audio when voice requests are being provided.

In accordance with another embodiment of the present invention, a differential amplifier 136*c* differences the audio output from the television signal and the input received at the microphone 136. This reduces the feedback which may occur when audio from the television is received by the microphone 136 together with user spoken commands.

In some embodiments of the present invention, a microphone 136 may be provided in a remote control unit 202 which is used to operate the system 194 as shown in FIG. 16. For example, the microphone input may be transmitted through a wireless interface 206 to the processor-based system 192 and its wireless interface 196 in one embodiment of the present invention. Alternatively, the remote control unit 202 may interface with the television receiver 134 through its wireless interface 198.

The bus 130 may be coupled to a bus bridge 140 that may have an extended integrated drive electronics (EIDE) coupling 142 in and Universal Serial Bus (USB) coupling 148 (i.e., a device compliant with the Universal Serial Bus Implementers Form Specification, Version 1.0 (www.usb.org)). Finally, the USB connection 148 may couple to a series of USB hubs 150.

The EIDE connection 142 may couple to a hard disk drive 146 and a CD-ROM player 144. In some embodiments, other equipment may be coupled including a video cassette recorder (VCR), and a digital versatile disk (DVD) player, not shown.

The bridge 140 may in turn be coupled to an additional bus 152 which may couple to a serial interface 156 which drives a infrared interface 160 and a modem 162. The interface 160 may communicate with the remote control unit 202. A basic input/output system (BIOS) memory 154 may also be coupled to the bus 152.

The infrared interface 160 may communicate with the remote control unit 202 and a recording device 164. The recording device 164 may include an infrared interface 166 and a recording unit 168. In one embodiment of the present invention, the interfaces 160 and 166 implement a bi-directional infrared interface. Again, the recording unit 168 may be an analog system for example using magnetic tape or a digital system using a random access memory such as a hard disk drive or a re-recordable digital video disk (DVD) drive.

The recording device 164 may also be a part of the overall computer system 104 and may be coupled to the couplings 142 or 148 as examples. That is, the recording device 164 may actually be internal to the processor-based system 194.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a speech recognizer that recognizes spoken commands for recording programming information;
   an interface that converts the recognized commands to a format compatible with a video recording device; and
   a memory that stores a meaning derived from said speech recognizer and historical information about previously recognized speech and uses the historical information to correct the meaning derived from said speech recognizer.

2. The system of claim 1 wherein said system parses a select clause and a where clause generated by recognition of a spoken command.

3. The system of claim 1 including a digital video recording device that communicates with said interface.

4. The system of claim 3 wherein said speech recognizer determines whether a query includes two different types of variables and if so, does not use the historical information to alter the meaning derived from said speech recognizer.

5. The system of claim 4 wherein said speech recognizer determines whether only one type of variable is included in a spoken command and if so, merges the variable with historical information to derive a meaning for the command.

6. The system of claim 1 including a speech synthesizer and a memory that stores an indication when an attribute recognized by the speech recognizer is spoken by the speech synthesizer.

7. The system of claim 1 including a memory that stores a library of stored video files.

8. The system of claim 1 further including a processor coupled to a speaker and microphone, the output from said speaker being subtracted from the output of said microphone to reduce interference between the audio portion of the programming and a spoken command.

9. The system of claim 1 including a television coupled to a set-top box and a remote control that controls said set-top box.

10. The system of claim 1 including a graphical user interface that operates with said recognizer to enable programming to be recorded in response to a spoken command.

11. A method comprising:
recognizing a spoken command to record programming information;
providing the recognized command to a video recording device;
storing a meaning derived from recognizing a spoken command and historical information about a previously spoken command; and
using the historical information to correct the meaning derived from a current spoken command.

12. The method of claim 11 including parsing select and where variables.

13. The method of claim 11 including determining whether the spoken command includes two different types of variables and if so, refraining from using historical information to alter the meaning derived from the spoken command.

14. The method of claim 13 including determining whether only one type of variable is included in a spoken command and if so, merging the variable with historical information to derive a meaning for the command.

15. The method of claim 11 including responding to voice commands to manage a schedule for recording an audio/visual program.

16. The method of claim 11 including searching through fields representing information about stored audio/visual programs to locate programming to be recorded.

17. A The method of claim 16 including assigning a tag to each audio/visual program stored in said system and identifying a tag in response to said search.

18. An article comprising a medium that stores instructions that enables a processor-based system to:
recognize a spoken command to record programming information;
provide the recognized command to a video recording device; and
store a meaning derived from recognizing a spoken command and historical information about a previously recognized spoken command and use the historical information to correct the meaning derived from a current spoken command.

19. The article of claim 18 further storing instructions that cause a processor-based system to parse select and where variables.

20. The article of claim 18 further storing instructions that enable a processor-based system to determine whether the spoken command includes two different types of variables and if so to refrain from using historical information to alter the meaning derived from the spoken command.

21. The article of claim 20 further storing instructions that cause a processor-based system to determine whether only one type of variable is included in the spoken command and if so, merge the variable with historical information to derive a meaning for the command.

22. The article of claim 18 further storing instructions that cause a processor-based system to respond to spoken commands to organize a library of recorded audio/visual programs.

23. The article of claim 18 further storing instructions that cause a processor-based system to respond to voice commands to manage a schedule for recording an audio/visual program.

24. The article of claim 18 further storing instructions that cause a processor-based system to search for fields representing information about stored audio/visual programs to locate programming to be recorded.

25. The article of claim 24 further storing instructions that cause a processor-based system to assign a tag to each audio/visual program stored in said system and identify a tag in response to said search.

26. A system comprising:
a speech recognizer that recognizes spoken commands for recording programming information;
an interface that converts the recognized commands to a format compatible with a video recording device;
a processor;
a speaker and microphone coupled to the processor, the output from said speaker being subtracted from the output of said microphone to reduce interference between the audio portion of the programming in a spoken command.

27. A system comprising:
a speech recognizer that recognizes spoken commands for recording programming information;
an interface that converts the recognized commands to a format compatible with a video recording device; and
a processor coupled to a speaker and microphone, the output from said speaker being subtracted from the output of said microphone to reduce interference between the audio portion of the programming and a spoken command.

28. A system comprising:
a speech recognizer that recognizes spoken commands for recording programming information;
an interface that converts the recognized commands to a format compatible with a video recording device;
a memory that stores a meaning derived from said speech recognizer and historical information about previously recognized speech and uses the historical information to correct the meaning derived from said speech recognizer; and
wherein said system parses a select clause and a where clause generated by recognition of a spoken command.

29. The system of claim 28 including a speech synthesizer and a memory that stores an indication when an attribute recognized by the speech recognizer is spoken by the speech synthesizer.

30. The system of claim 28 including a memory that stores a library of stored video files.

31. The system of claim 28 including a television coupled to a set-top box and a remote control that controls said set-top box.

32. The system of claim 28 including a graphical user interface that operates with said recognizer to enable programming to be recorded in response to a spoken command.

33. The system of claim 28 including a digital video recording device that communicates with said interface.

34. An article comprising a medium that stores instructions that enable a processor-based system to:
recognize a spoken command to record programming information;
provide the recognized command to a video recording device;

parse select and where variable;

store a meaning derived from recognizing a spoken command and historical information about a previously recognized spoken command; and use historical information to correct the meaning derived from a current spoken command.

35. The article of claim 34 further storing instructions that enable a processor-based system to determine whether the spoken command includes two different types of variables and if so to refrain from using historical information to alter the meaning derived from the spoken command.

36. The article of claim 34 further storing instructions that enable a processor-based system to determine whether only one type of variable is included in the spoken command and if so, merge the variable with historical information to derive a meaning for the command.

37. The article of claim 34 further storing instructions that enable a processor-based system to respond to spoken commands to organize a library of recorded audio/visual programs.

38. The article of claim 34 further storing instructions that enable a processor-based system to respond to voice commands to manage a schedule for recording an audio/visual program.

39. The article of claim 24 further storing instructions that enable a processor-based system to search for fields representing information about stored audio/visual programs to locate programming to be recorded.

40. The article of claim 34 further storing instructions that enable a processor-based system to assign a tag to each audio/visual program stored in said system and identify a tag in response to said search.

41. A system comprising:

a speech recognizer that recognizes spoken commands for recording programming information;

an interface that converts the recognized commands to a format compatible with a video recording device;

a processor coupled to a speaker and a microphone, the output from said speaker being subtracted from the output of said microphone to reduce interference between the audio portion of the programming and a spoken command; and wherein said system parses a select clause and a where clause generated by recognition of a spoken command.

* * * * *

UNITED STATES PATENT AND TRADEMARK OFFICE
CERTIFICATE OF CORRECTION

PATENT NO.   : 6,456,978 B1
DATED        : September 24, 2002
INVENTOR(S)  : Ben S. Wymore, Christopher H. Genly and David G. Hicks It is certified that error appears in the above-identified patent and that said Letters Patent is hereby corrected as shown below:

<u>Column 18,</u>
Line 1, "24" should be -- 34 --.

Signed and Sealed this

Twenty-fourth Day of December, 2002

JAMES E. ROGAN
*Director of the United States Patent and Trademark Office*